Dec. 6, 1927. 1,651,760
J. E. FUNK
HOISTING DRUM MECHANISM
Filed Jan. 21, 1927
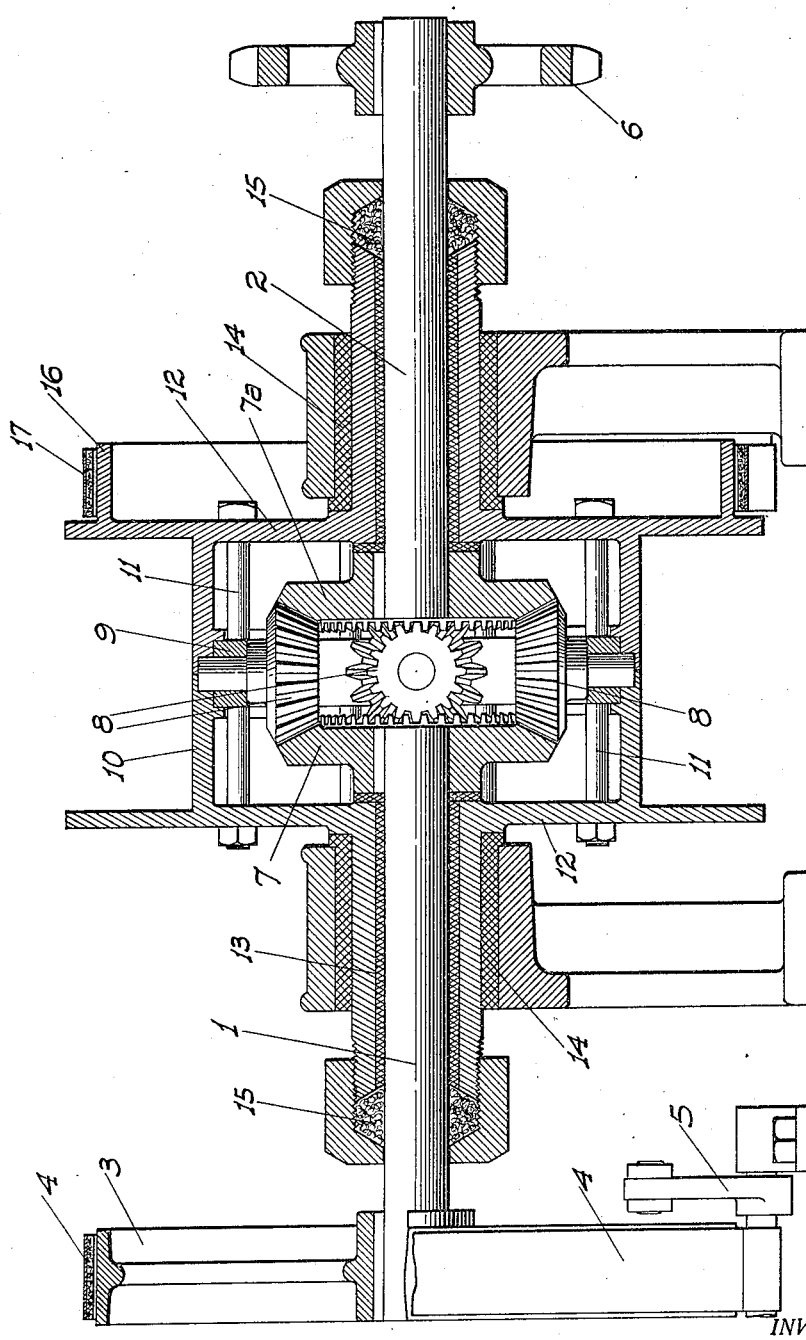
INVENTOR.
J. E. Funk
BY
ATTORNEY Patented Dec. 6, 1927.

1,651,760

UNITED STATES PATENT OFFICE.

JOHN EMMET FUNK, OF STOCKTON, CALIFORNIA.

HOISTING-DRUM MECHANISM.

Application filed January 21, 1927. Serial No. 162,497.

This invention relates to improvements in the construction of the control mechanisms of cable drums used in connection with hoists of various kinds in which the drum at times must be driven to wind the cable thereon and at other times must run slack to permit the cable to unwind.

The control mechanisms of such drums usually comprise clutches of some kind interposed between the drive shafts and the drums, which are thrown in or out by the operator as the occasion demands. The clutches are subject to severe strains, tend to wear out, and unless of the type which can be slipped without damage the drums can only have a certain definite speed when the clutches are engaged.

The principal objects of my invention therefore are to provide a control mechanism for a hoisting drum so arranged that the use of a clutch is eliminated; the drum can be driven at different speeds; the major part of the control mechanism is contained in a bath of oil so that wear is reduced to a minimum; and a reduction of speed of the rotation of the drum over that of the drive shaft, with a consequent increase of power, is obtained.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

The figure on the drawing is a sectional elevation of my improved hoist drum control structure.

Referring now more particularly to the characters of reference on the drawings, the numerals 1 and 2 denote a pair of longitudinally alined and separated shafts. The outer end of the shaft 1 has a brake drum 3 fixed thereon with a band 4 thereabout, the ends of the band being connected to any suitable form of contracting means indicated at 5, which may be operated from any desired distance. The outer end of the shaft 2 has a driver fixed thereon, such as a sprocket wheel 6 arranged for connection to any desired form of power.

Fixed on the adjacent ends of the shafts 1 and 2 are bevel gears 7 and $7^a$ respectively, meshing with pinions 8 mounted in a spider 9. The spider is fixed inside the cable drum 10, which is preferably formed of two vertically split sections connected together by bolts 11 for convenience of manufacture. The drum at its end has solid walls 12 extending to the shafts so that the spider and the various gears are enclosed in a chamber which may be maintained full of oil. Projecting outwardly from the drum walls a certain distance are sleeve hubs 13 in which the shafts 1 and 2 are journaled. The hubs in turn intermediate their ends are journaled in fixed bearings 14 of suitable character which support the entire structure. At the outer ends of the hubs stuffing glands 15 are provided in connection therewith, which engage the shafts 1 and 2 and prevent leakage of oil from the drum chamber. A brake drum 16 is also preferably provided in connection with the cable drum 10, the band 17 of the brake drum being hand controlled by any suitable means.

It will therefore be seen that in my control mechanism I make use of the differential gear principle such as is employed in the automative industry. In operation the shaft 2 may be constantly driven. If the band 4 is left slack the pinions are free to rotate. The cable drum will then either remain stationary or may turn somewhat in the same direction as the shaft 2, if no resistance is offered to such turning. Definite holding of the drum against rotation is had in this case by applying the band 17 to the cable drum. If a rotative movement is imparted to the drum from an exterior point, as when the cable tends to unwind from the drum due to the weight supported thereby, the spider and pinion will turn as a unit about the gear $7^a$ of the shaft 2, since the shaft 1 and its gear 7 are free to rotate so as not to interfere with the revolutions of the pinions about their axes. If, however, the band 4 is clamped about its drum 3 the shaft 1 and the gear 7 secured thereto will of course be held stationary. The driven rotation of the gear $7^a$ will therefore cause the pinions and spider to turn as a unit about the shafts as an axis, since the pinions cannot then rotate on their axes without also advancing about the shaft axes. Since the spider is fixed to the cable drum the latter will of course be also drivingly rotated. This speed of rotation will as evident be less in any event than that of the driving shaft 2, owing to the employment of the differential gearing through which the power is transmitted. This relative speed may also be varied by varying the holding pressure of the band 4 on the drum 3 so that the resistance of the shaft 1 to turning will be proportionately altered.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

A hoist drum mechanism including a drum formed of a pair of vertically split and symmetrical parts, separated shafts turnably mounted in the drum, opposed bevel gears on the adjacent ends of the shafts, pinions between and engaging the gears, a spider ring in which the pinions are mounted fitted inside the drum and centrally disposed relative to the split-line of the parts thereof, flanges projecting inwardly to locate the ring and engage the opposite sides thereof, and bolts through the drum members and through the ring to clamp the drum members and ring together and hold the ring against rotation in the drum.

In testimony whereof I affix my signature.

JOHN EMMET FUNK.